United States Patent [19]

Watanabe

[11] Patent Number: 5,104,162
[45] Date of Patent: Apr. 14, 1992

[54] APPARATUS FOR ALIGNING AND ASSEMBLING CLUTCH PLATES AND CLUTCH GUIDES IN A MULTIPLE DISK CLUTCH

[75] Inventor: Tohru Watanabe, Zama, Japan

[73] Assignee: Shin Caterpillar Mitsubishi Ltd., Tokyo, Japan

[21] Appl. No.: 445,759

[22] Filed: Dec. 4, 1989

Related U.S. Application Data

[62] Division of Ser. No. 305,013, Feb. 2, 1989, Pat. No. 4,910,856.

[30] Foreign Application Priority Data

Mar. 17, 1988 [JP] Japan .................. 63-64582

[51] Int. Cl.$^5$ .............................. B25B 27/14
[52] U.S. Cl. ................................... 29/274
[58] Field of Search .......... 29/433, 468, 464, 241, 29/274, 467, 271

[56] References Cited

U.S. PATENT DOCUMENTS

| | | | |
|---|---|---|---|
| 1,941,022 | 12/1933 | Shelley | 29/468 |
| 3,099,875 | 8/1963 | Lelis | 29/274 X |
| 3,686,739 | 8/1972 | Manero | 29/274 |
| 4,071,940 | 2/1978 | Hazelton | 29/468 |
| 4,231,147 | 11/1980 | Witt | 29/274 X |
| 4,564,994 | 1/1986 | Marx | 29/468 |
| 4,640,294 | 2/1987 | Ordo | 29/274 X |
| 4,712,974 | 12/1987 | Kane | 29/468 X |
| 4,921,397 | 5/1990 | Watanabe . | |

FOREIGN PATENT DOCUMENTS 163827 9/1983 Japan .

Primary Examiner—Mark Rosenbaum
Assistant Examiner—Frances Chin
Attorney, Agent, or Firm—Wegner, Cantor, Mueller and Player

[57] ABSTRACT

There is disclosed a method and apparatus for aligning and assembling disk-shaped works having projections on outer peripheries thereof.

A vessel-shaped work is positioned and a plurality of disk-shaped works in a stacked condition are guided to a position on the opening edge of the vessel-shaped work by the work guide means, and then the pin provided for up and down movement on the rotary head is either inserted between adjacent ones of the projections of the disk-shaped works or contacted with and stopped by an upper face of one of the projections of the disk-shaped works. Also when the pin is stopped by the upper face of the one projection, as the rotary head is rotated, the pin is moved in the circumferential direction of the disk-shaped works so that it is disengaged from the upper face of the one projection and then engaged with an adjacent one of the projections of the disk-shaped work. Thus, the disk-shaped works are finally rotated in an integral relationship by the pin. Accordingly, the projections of the disk-shaped works are successively aligned with and fitted into the recessed grooves of the vessel-shaped work beginning with the lowermost one of the disk-shaped works. In this manner, the plurality of disk-shaped works are finally assembled in an aligned condition to the inside of the vessel-shaped work.

4 Claims, 8 Drawing Sheets

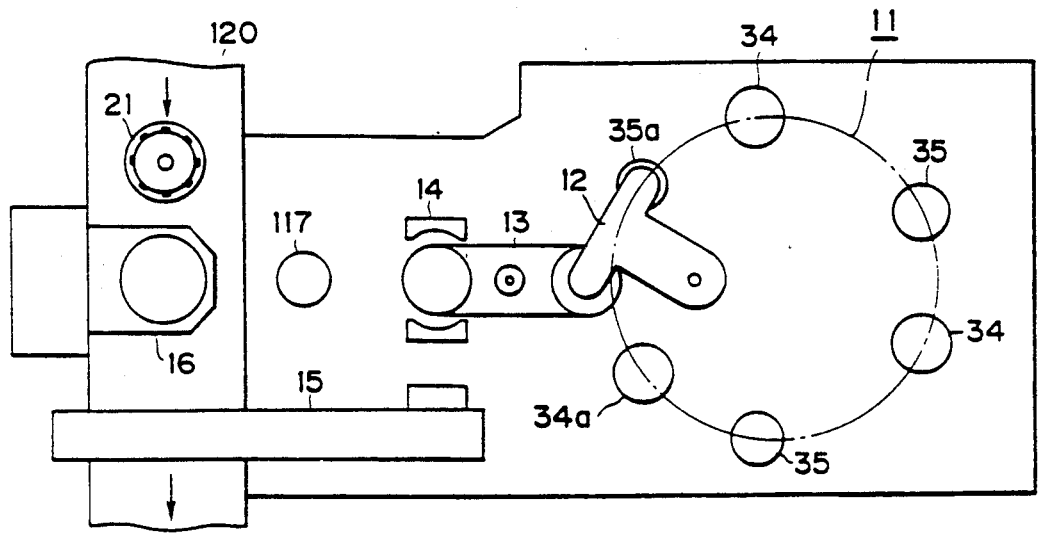
FIG. I
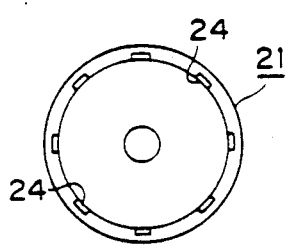
FIG. 2A
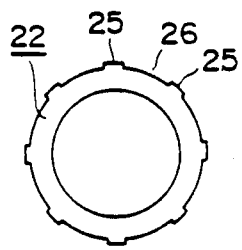
FIG. 3A
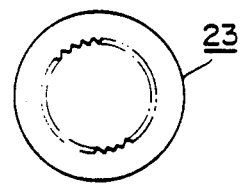
FIG. 4A
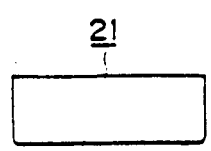
FIG. 2B
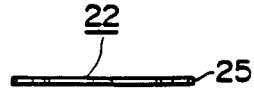
FIG. 3B
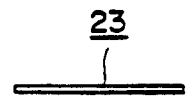
FIG. 4B

APPARATUS FOR ALIGNING AND ASSEMBLING CLUTCH PLATES AND CLUTCH GUIDES IN A MULTIPLE DISK CLUTCH

This application is a divisional of U.S. application Ser. No. 305,013, filed Feb. 2, 1989, now U.S. Pat. No. 4,910,856.

BACKGROUND OF THE INVENTION

This invention relates generally to an automatic assembling apparatus for disk-shaped works, and more particularly to a method of and an apparatus for aligning and assembling such disk-shaped works having projections on outer peripheries thereof as clutch plates which are assembled in an alternate relationship with a plurality of clutch disks to the inside of a clutch guide in order to form a multiple disk clutch.

A large number of projections are formed in a predetermined pitch on an outer periphery of each of clutch plates which constitute a multiple disk clutch. The projections of the clutch plates are individually fitted for sliding movement in an axial direction in recessed grooves formed on an inner peripheral wall of a clutch guide. In production of a multiple disk clutch having such a construction as described above, at first clutch plates and clutch disks are supplied to a predetermined stacking position by separate transporting means and stacked in an alternate relationship there, and then the projections of the individual clutch plates are aligned with and fitted into the recessed grooves of the clutch guide by hand in order to fit the clutch plates and the clutch disks in an alternately stacked relationship in the clutch guide.

A considerable clearance is not left between the projections of the clutch plates and the recessed grooves of the clutch guide. Accordingly, alignment of the projections with the recessed grooves is not easy. Besides, since a plurality of such clutch plates and clutch disks must necessarily be stacked in an alternate relationship and then assembled to a single clutch guide, the assembling operation is cumbersome, and also where it is intended to mechanize the assembling operation, there is a problem that the equipment will be complicated.

SUMMARY OF THE INVENTION

It is an object of the present invention to provide a method of and an apparatus for aligning and assembling disk-shaped works having projections on peripheral faces thereof to a vessel-shaped work.

It is another object of the present invention to provide an automatic assembling apparatus for a multiple disk clutch which includes clutch plates and clutch disks stacked in an alternate relationship.

In accordance with an aspect of the present invention, there is provided a method of assembling a plurality of disk-shaped works having projections formed on outer peripheries thereof to a vessel-shaped work having recessed grooves formed on an inner periphery thereof with said projections of said disk-shaped works fitted in said recessed grooves of said vessel-shaped work, comprising the steps of placing a plurality of disk-shaped works on an opening edge of a vessel-shaped work, resiliently projecting a pin at a radial position at which said projections are provided with respect to the center of said disk-shaped works until either said pin extends through said disk-shaped works between adjacent ones of said projections or an end of said pin is contacted with and stopped by an upper face of one of said projections of said disk-shaped works, and moving said pin in a circumferential direction of said disk-shaped works to disengage, when said end of said pin is stopped by the one projection, said pin from the one projection until said pin is engaged with another projection in the circumferential direction and rotates the disk-shaped work, whereby said disk-shaped works are dropped into the inside of said vessel-shaped work beginning with the lowermost one the projections of which are aligned with the recessed grooves of the vessel-shaped work.

With the method, in case the resiliently projected pin is contacted with and stopped by an upper face of one of the projections of the disk-shaped works, when the pin is moved in the circumferential direction, the end of the pin is disengaged from the upper face of the one projection. Then, even if the end of the pin is engaged with an upper face of a projection of another disk-shaped work below, it will be soon disengaged from the upper face of the projection in a similar manner during subsequent continued circumferential motion of the pin. In this manner, the pin is finally cleared of all of the projections of the disk-shaped works in the stacked condition Further by such circumferential motion of the pin, the pin is engaged with adjacent projections of the disk-shaped works and rotates the disk-shaped works until the projections thereof are aligned with each other Thus, the disk-shaped works in the stacked condition are rotated in an integral relationship, and during such rotation of the disk-shaped works, at an instant when the projections are aligned with the recessed grooves of the vessel-shaped work, the disk-shaped works are successively admitted into the vessel-shaped work beginning with the lowermost one.

According to another aspect of the present invention, there is provided an apparatus for assembling a plurality of disk-shaped works having projections formed on outer peripheries thereof to a vessel-shaped work having recessed grooves formed on an inner periphery thereof with said projections of said disk-shaped works fitted in said recessed grooves of said vessel-shaped work, comprising work guide means mounted for up and down movement for positioning said vessel-shaped work at a predetermined position and for guiding said plurality of disk-shaped works in a stacked condition to a position on an opening edge of said vessel shaped work, a rotary head mounted for rotation in a coaxial relationship above said work guide, a pin mounted for up and down movement on said rotary head at radial position of said projections of said disk-shaped works over a distance sufficient to cover the overall height of said disk-shaped works in the stacked condition, means for resiliently urging said pin to move an end of said pin to a position between adjacent ones of said projections of a lowermost one of said disk-shaped works in the stacked condition, and rotational driving means for rotating said rotary head.

With the apparatus, a vessel-shaped work is positioned and a plurality of disk-shaped works in a stacked condition are guided to a position on the opening edge of the vessel-shaped work by the work guide means, and then the pin provided for up and down movement on the rotary head is either inserted between adjacent ones of the projections of the disk-shaped works or contacted with and stopped by an upper face of one of the projections of the disk-shaped works Also when the pin is stopped by the upper face of the one projection, as the rotary head is rotated, the pin is moved in the circumferential direction of the disk-shaped works so that it is disengaged from the upper face of the one projection and then engaged with an adjacent one of the projections of the disk-shaped work. Thus, the disk-shaped works are finally rotated in an integral relationship by the pin. Accordingly, the projections of the disk-shaped works are successively aligned with and fitted into the recessed grooves of the vessel-shaped work beginning with the lowermost one of the disk-shaped works In this manner, the plurality of disk-shaped works are finally assembled in an aligned condition to the inside of the vessel-shaped work.

According to still another aspect of the present invention, there is provided an automatic assembling apparatus for multiple disk clutch comprising a work stacking mechanism for stacking a plurality of clutch plates having projections formed thereon and clutch disks alternately, transporting means for transporting said alternately stacked clutch plates and clutch disks to an assembling position, and an assembling mechanism for assembling said alternately stacked clutch plates and clutch disks into a clutch guide having recessed grooves formed on an inner periphery thereof.

Said work stacking mechanism includes first stocking means for stocking a plurality of stacked clutch plates at a predetermined first work supply position, second stocking means for stocking a plurality of stacked clutch disks at a predetermined second work supply position, means for receiving said clutch plates and said clutch disks alternately, a stacking arm pivotally mounted for rocking motion between said first and second work supply positions and said receiving means, and chuck means mounted on said stacking arm for chucking the uppermost clutch plate and clutch disk alternately.

Said assembling mechanism includes a work guide mounted for up and down movement for positioning said clutch guide at a predetermined position and for guiding said alternately stacked clutch plates and clutch disks to a position on an opening edge of said clutch guide, a rotary head mounted for rotation in a coaxial relationship with and above said work guide, a pin mounted for up and down movement on said rotary head at a radial position of said projections of said clutch plates over a distance sufficient to cover the overall height of said stacked clutch plates and clutch disks, means for resiliently urging said pin to move downwardly until an end of said pin to reach a position between adjacent ones of said projections of a lowermost one of said clutch plates, and means for rotationally driving said rotary head.

The above and other objects, features and advantages of the present invention will become more apparent from the following description taken in conjunction with the accompanying drawings.

BRIEF DESCRIPTION OF THE DRAWINGS

FIG. 1 is a schematic representation showing an entire arrangement of an automatic assembling apparatus for a multiple disk clutch;

FIGS. 2A and 2B are a plan view and a side elevational view of a clutch guide, respectively;

FIGS. 3A and 3B are a plan view and a side elevational view of a clutch plate, respectively;

FIGS. 4A and 4B are a plan view and a side elevational view of clutch disk, respectively;

DESCRIPTION OF THE PREFERRED EMBODIMENT

Figure 5:
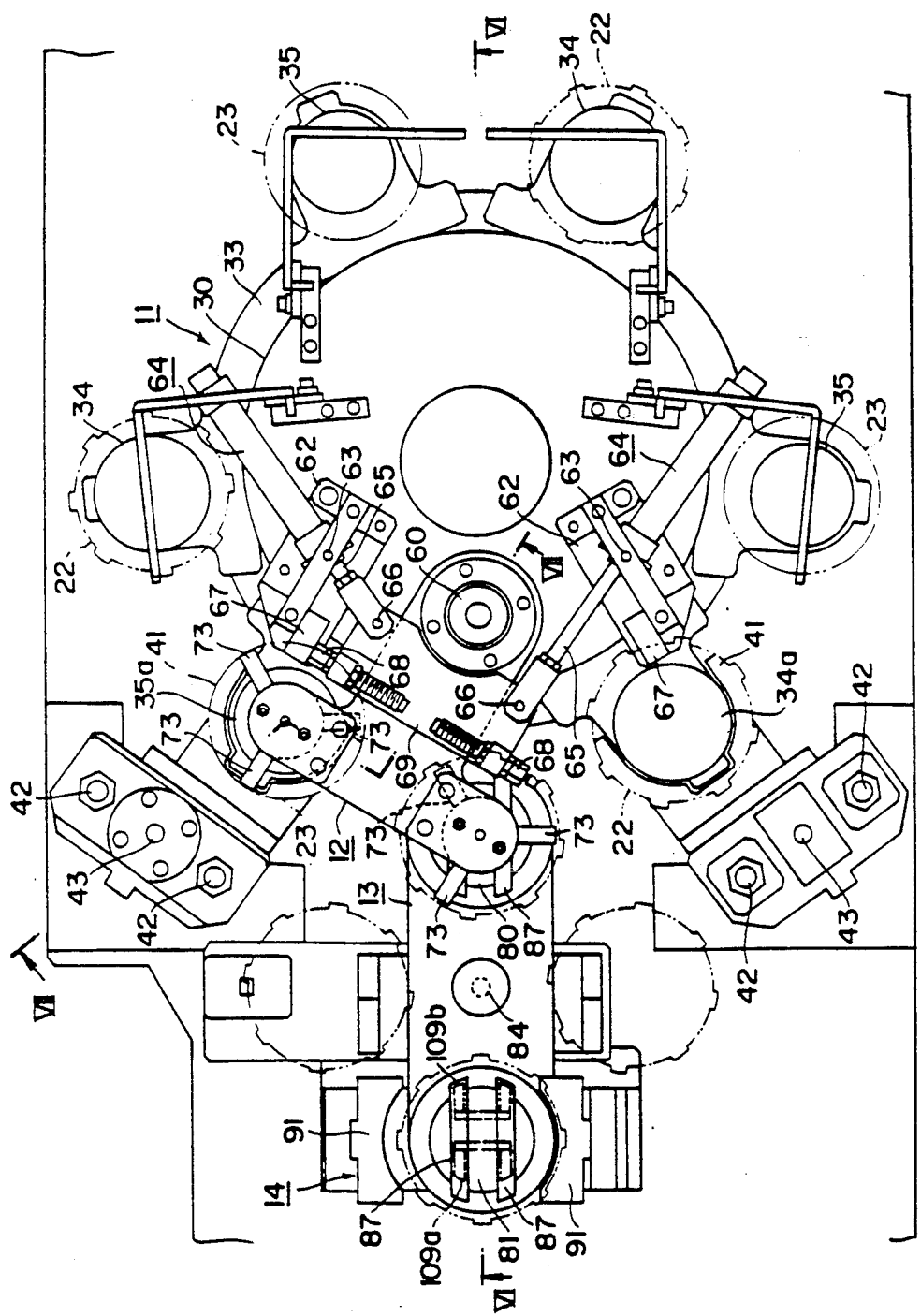
FIG. 5 is a plan view of a stacking device for stacking clutch plates and clutch disks as disk-shaped works in an alternate relationship.

In the following, the present invention will be described in detail in connection with an embodiment shown in the drawings.

Referring first to FIG. 1, an automatic assembling machine shown includes a work stocker 11, a stacking arm 12, a rotary arm 13, a gage unit 14, a transporting apparatus 15 and an aligning and assembling apparatus 16.

The automatic assembling machine fits a plurality of such clutch plates 22 as shown in FIGS. 3A and 3B and a plurality of such clutch disks 23 as shown in FIGS. 4A and 4B both as disk-shaped works into a clutch guide 21 as a vessel-shaped work shown in FIGS. 2A and 2B. In this instance, projection 25 formed on an outer periphery of each of the clutch plates 22 are fitted in recessed grooves 24 formed on an inner peripheral wall of the clutch guide 21. The clutch disks 23 have an outer diameter which is substantially equal to the outer diameter of the clutch plates 22 and a little smaller than the inner diameter of the clutch guide 21. It is to be noted that the clutch plates 22 and the clutch disks 23 may be commonly denoted by the word "work" or "works". In the following, the individual components of the automatic assembling machine will be described in order.

Figure 6:
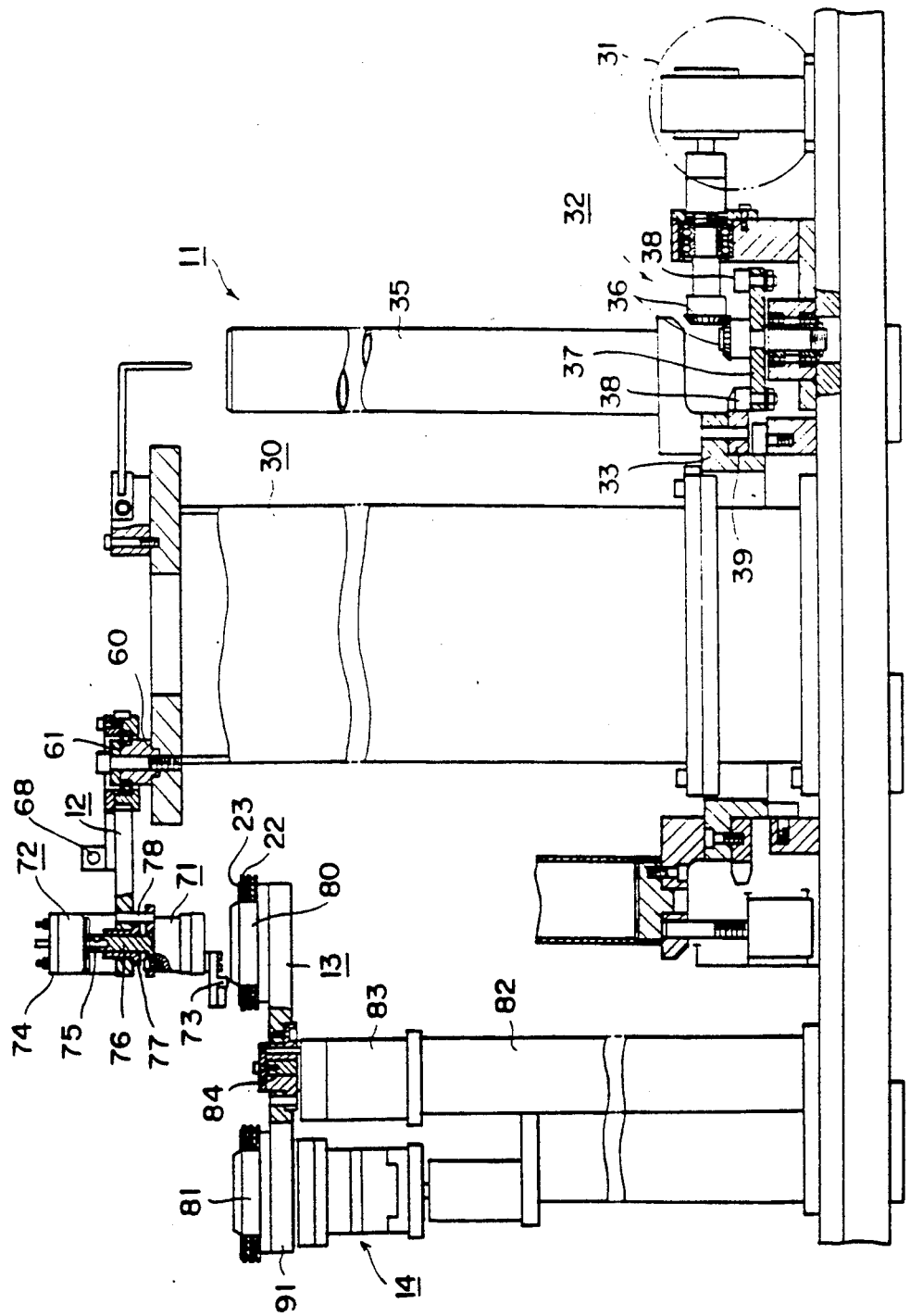
FIG. 6 is a sectional view taken along line VI—VI of FIG. 5.
Figure 7:
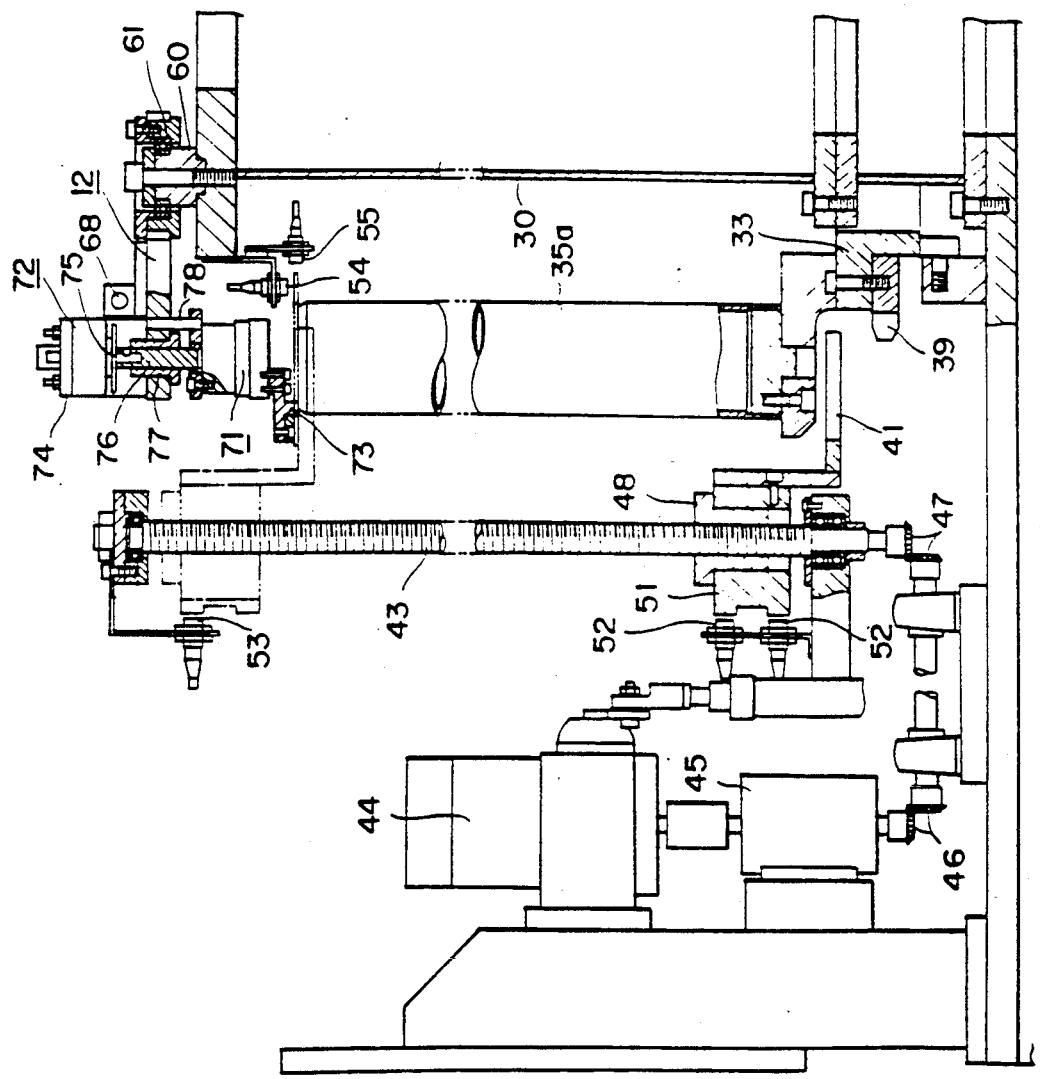
FIG. 7 is a sectional view taken along line VII—VII of FIG. 5.

(A) Work Stocker (FIGS. 5, 6 and 7)

The work stocker 11 includes a rotary ring 33 mounted for rotation in a horizontal plane at a lower portion of a center column 30 as shown in FIG. 6. The rotary ring 33 is connected to be rotated by 120 degrees by a motor 31 by way of a rotation transmitting mechanism 32. Three clutch plate stock rods 34 and three clutch disk stock rods 35 are provided uprightly in an alternate relationship along a circumferential line on an upper face of the rotary ring 33 as shown in FIG. 5. The clutch plate stock rod 34a and the clutch disk stock rod 35a which are shown positioned individually at leftmost positions in FIG. 5 are positioned at respective work supplying positions and thus operate in pair. About 300 clutch plates 22 and clutch disks 23 are fitted on each of the rods 34 and 35, respectively.

The rotation transmitting mechanism 32 is composed of a bevel gear 36, a plurality of rollers 38 supported in a predetermined pitch for rotation on a disk 37 which is rotated by way of the bevel gear 36, a sprocket wheel 39 for meshing engagement with the individual rollers 38, and so on.

Rotation exerted from the motor 31 is transmitted to the rotary ring 33 integral with the sprocket wheel 39 by way of the rotation transmitting mechanism 32 so that the rotary ring 33 is rotated by an angle of 120 degrees at a point of time when the clutch plates 22 and clutch disks 23 are all supplied from the stock rods 34a and 35a, respectively, at the individual work supplying positions to empty the stock rods 34a and 35a. Consequently, the rods 34 and 35 which have been at their individual stand-by positions are shifted to the work supplying positions indicated at 34a and 35a, respectively.

A C-shaped fork 41 for pushing up works one by one is provided for each of the stock rods 34a and 35a at the supplying positions as shown in FIG. 5. The fork 41 is mounted for up and down movement along a pair of guide rods 42 and moved up and down by means of a ball screw 43. The ball screw 43 is rotated by a variable speed motor 44 by way of a clutch brake 45 and a pair of bevel gears 46 and 47 as seen in FIG. 7, and the fork 41 is mounted on a female screw 48 with which the ball screw 43 is held in threaded engagement. A member 51 is provided on the female screw 48, and a sensor 52 such as a contactless switch is mounted at a predetermined position for detecting a lower limit position of the member 51 while another sensor 53 such as a contactless switch is located at another predetermined position for detecting an upper limit position of the member 51. Further sensors 54 and 55 such as contactless switches for detecting a face of a work at a lifted position and for detecting a work having a different diameter, respectively, are disposed near upper ends of the stock rods 34a and 35a, respectively, at the work supplying positions as shown in FIG. 7.

When an uppermost one of works is to be taken out from the top end of the stock rod 34a or 35a by means of a chuck of the stacking or layering arm 12 which will be hereinafter described, at a point of time when the uppermost work is chucked, the variable speed motor 44 is activated to move down the fork 41 once to separate the uppermost work from the other works below, and then once the uppermost work is taken out, the variable motor 44 is driven reversely to move up the fork 41 until the sensor 54 detects presence of a work again. The fork 41 is thus stopped at a position moved by a distance equal to the thickness of the work from the formerly lifted position. Consequently, the upper end of the works is maintained constant. At the same time, in case the work has a different diameter, the different diameter work is detected by the different diameter work discriminating sensor 55.

(B) Stacking Arm (FIGS. 5, 6 and 7)

The stacking arm 12 has a T-shaped configuration as seen in FIG. 5 and is supported at a base end thereof for pivotal motion on a shaft portion 60 at an upper face of the center column 30 by way of a bearing 61 or the like as shown in FIGS. 6 and 7. A pair of arm rocking cylinders 64 are supported for pivotal motion by means of shafts 63 on a pair of mounting plates 62 provided on the upper face of the center column 30 as shown in FIG. 5, and an end of a piston rod 65 of each of the cylinders 64 is connected to a member 69 integral with the T-shaped stacking arm 12 by means of a shaft 66. Accordingly, as the piston rods 65 of the pair of cylinders 64 are alternately driven to be extended and contracted, the stacking arm 12 is rocked around a fulcrum provided by the shaft portion 60. A stopper 67 for restricting the range of rocking motion of the stacking arm 12 is provided on the mounting plate 62, and an adjusting screw 68 screwed into a member on the stacking arm 12 side is contacted with and stopped by the stopper 67.

A pair of sets each including a chuck 71 for gripping a clutch plate 22 or a clutch disk 23 thereon and a solenoid for moving the chuck 71 up and down are provided at opposite end portions of the cross bar of the T-shape of the stacking arm 12 as seen in FIGS. 6 and 7. Each of the chucks 71 is an air chuck including three way claws 73 mounted for movement in radial directions thereon as seen in FIG. 5, and when the three way claws 73 of the chuck 71 are expanded or moved radially outwardly, they are pressed against an inner peripheral face of a clutch plate 22 or a clutch disk 23. Meanwhile, each of the solenoids 72 is mounted on a mounting plate 74 on the stacking arm 12 as shown in FIGS. 6 and 7, and a shaft 76 is connected in an integral relationship to a driving shaft 75 for the solenoid 72. The shaft 76 is fitted for up and down movement in a sleeve 77 fitted in the stacking arm 12, and the air chuck 71 is connected to the solenoid 72 by way of the shaft 76. A pin 78 for preventing rotation of the chuck is provided in an integral relationship at an upper portion of the chuck 71 and fitted for up and down movement in the stacking arm 12.

When the three way claws 73 of the air chuck 71 are in a condition retracted to the center side, that is, in a radially inwardly moved positions, the shaft 76 is moved down by the solenoid 72 so that the claws 73 are fitted into the inside of one of the clutch plates 22 or clutch disks 23 at an uppermost position of the stock rod 34a or 35a, and then the three claws 73 are expanded or moved radially outwardly to hold the one work from the inside, whereafter the work is moved up by activation of the solenoid 72 and then the stacking arm 12 is pivoted by the cylinder 64 to move the work in a horizontal direction.

The stacking arm 12 is rocked leftwardly and rightwardly to alternately chuck the clutch plates 22 and the clutch disks 23 at the top ends of the stock rods 34a and 35a by means of the left and right chucks 71 thereon and stack the works on a locator 80 which is located at an end of the rotary arm 13 and will be hereinafter described in detail. Thus, a total of six works, that is, three clutch plates 22 and three clutch disks 23, are stacked on the locator 80.

(C) Rotary Arm

The rotary arm 13 includes a pair of stacking locators 80 and 81 mounted at the opposite end portions thereof as shown in FIG. 6, and a central portion of the rotary arm 13 is integrally fitted on and screwed to a rotary shaft 84 of a motor 83 located at an upper end of a support 82. If up to six works are fitted and stacked on one of the locators 80 and 81 by the stacking arm 12, then the rotary arm 13 is rotated by an angle of 180 degrees around the rotary shaft 84 at the center thereof to feed the stacked works to the gage unit 14. Each of the locators 80 and 81 has a pair of recessed grooves 87 formed thereon such that a pair of chuck claws of the transporting apparatus 15 which will be hereinafter described may be inserted into the recessed grooves 87 to take out the stacked works from the locator 80 or 81.

Figure 8:
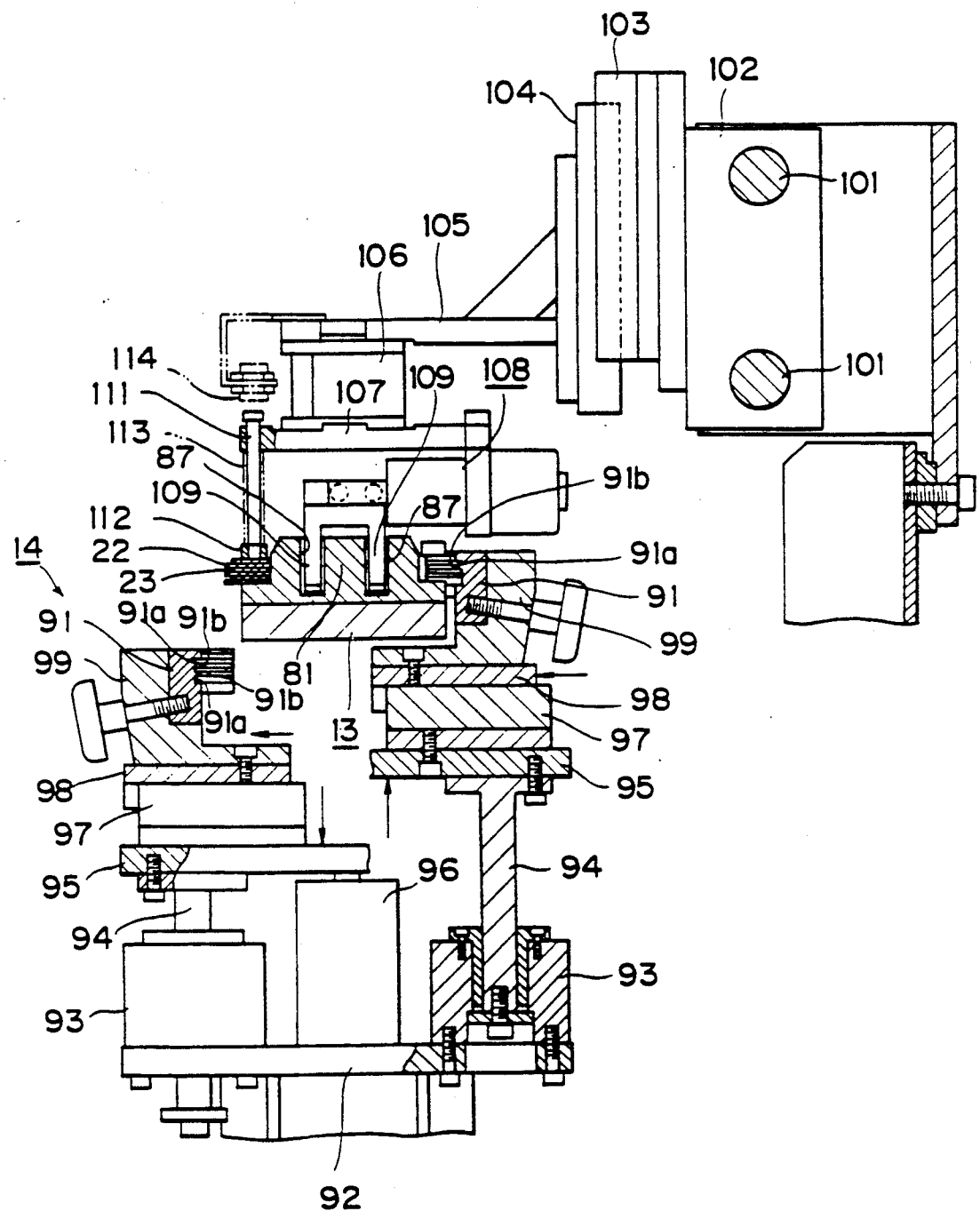
FIG. 8 is a cross sectional view of a gage unit and a transporting apparatus.

(D) Gage Unit (FIGS. 5, 6 and 8)

The gage unit 14 includes a pair of gages 91 disposed in an opposing relationship to each other and having an arcuate configuration as seen in FIG. 5 and a comb-shaped cross section as seen in FIG. 8. It is to be noted that, in FIG. 8, the right-hand side gage 91 is shown at its upwardly moved position while the left-hand side gage 91 is shown at its downwardly moved position. The gage unit 14 includes a vertically movable plate 95 mounted for up and down vertical movement under the guidance of a rod 94 which is fitted in a slide bearing 93 of a base 92. The vertically movable plate 95 is moved up and down by a vertically moving cylinder 96 mounted on the base 92. A pair of horizontal guide members 97 are disposed on a straight line on an upper face of the vertically movable plate 95, and a slider 98 is fitted for sliding movement in each of the guide members 97. A gage receiver 99 is provided in an integral relationship on each of the slider 98, and the gages 91 are individually screwed to the gage receivers 99. The gage receivers 99 in pair are moved in directions toward and away from each other by individual air cylinders not shown.

The gages 91 normally assume their stand-by positions as shown by the left-hand side gage 91 in FIG. 8 wherein they are at the downwardly moved positions and spaced away from each other in an open condition. Then, if six stacked works are fed to the gage 91 by the rotary arm 13, the gages 91 are moved upwardly as shown by the right-hand side gage 91 in FIG. 8 and further moved toward each other whereupon they hold the stacked works fitted on the locator 81 from the opposite sides. In this instance, the projections 25 of the clutch plates 22 are fitted into the recessed grooves 91a of the gage 91 while projections 91b of the gages 91 are fitted with the outer peripheries of the clutch disks 23.

If the six works are stacked in a correct order when the gages 91 are closed or moved toward each other, then the gages 91 can advance to individually predetermined positions. On the other hand, if the six works are not stacked in a correct order or a work having a different thickness is mixed in the six works, or else if more than six works are stacked, the gages 91 will be stopped forwardly of the predetermined positions, which will be detected by a sensor not shown.

The gages 91 have another function to center the clutch plates 22 and the clutch disks 23.

(E) Transporting Apparatus (FIG. 8)

The transporting apparatus 15 includes guide rods 101 extending in a horizontal direction, and a horizontal slider 102 fitted on the guide rods 101 for sliding movement by an air cylinder not shown or the like A vertical guide member 103 is mounted in an integral relationship on the slider 102, and a vertical slider 104 is fitted on the vertical guide member 103 for up and down vertical movement by an air cylinder not shown or the like. A transporting head 107 is mounted on the vertical slider 104 by means of supporting members 105 and 106. A chuck 108 for holding a work thereon is provided on the transporting head 107. The chuck 108 includes a pair of claws 109 having an inverted U-shaped configuration as shown in FIG. 8. The claws 109 are inserted in the recessed grooves 87 of the locator 81 when they are in such an inwardly moved or closed condition as shown by the left-hand side claw 109a in FIG. 5, and when they are moved outwardly or opened as shown by the right-hand side claw 109b in FIG. 5, they hold works from the inside.

Thus, after the gages 91 are retracted from works, the chuck 108 which holds the works thereon by means of the claws 109 thereof is moved up under the guidance of the vertical guide member 103, and then the works are taken out of the locator 81 and the stacked works are transported in a horizontal direction along the guide rods 101.

Further, a plurality of pressing rings 112 are provided around the claws 109 of the chuck 108 as shown in FIG. 8. The pressing rings 112 are each supported on a rod 111 fitted for up and down movement on the transporting head 107 and normally urged downwardly by a spring 113. A stack number sensor 114 such as a contactless switch is located adjacent and above each of the rods 111.

Thus, stacked works held by the claws 109 are pressed by the pressing rings 112 from above to prevent displacement of the works during transportation. Since a ring 112 assumes a position lower than its predetermined vertical position when the number of the stacked works is smaller than 6, the vertical position of the rod 111 is detected by the sensor 114 to judge whether or not the works are in a correctly stacked condition.

When a different work is detected at the stocker 11, when a rejected or defective work is detected by checking at the gage unit 14 and when a lack in number of works is detected at the pressing ring 112, the works are transported to a discharging stock rod 117 (FIG. 1) having a similar configuration to the stock rods 34 and 35 of the work stocker 11, and then at the position, the chuck 108 is actuated to close the claws 109 to remove the claws 109 from the works to permit the works to drop onto the discharging stock rod 117.

In case there is no error with the works, they are then transported to the aligning and assembling apparatus 16.

(F) Aligning and Assembling Apparatus (FIGS. 9 to 13)

As shown in FIG. 1, the aligning and assembling apparatus 16 is located above a conveyor 120 which is provided for carrying a clutch guide 21.

Figure 9:
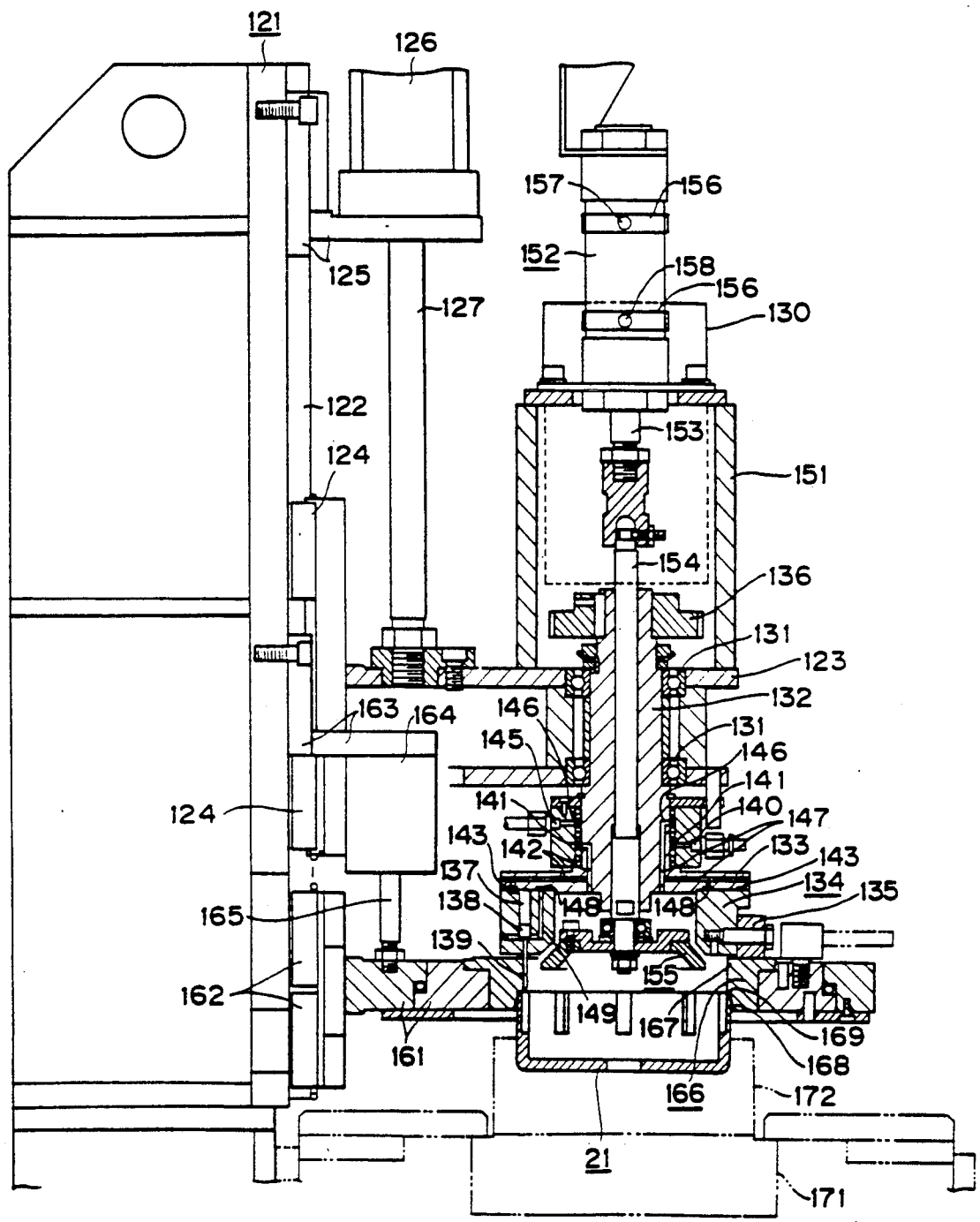
FIG. 9 is a cross sectional view of an aligning and assembling apparatus according to an embodiment of the present invention.
Figure 13:
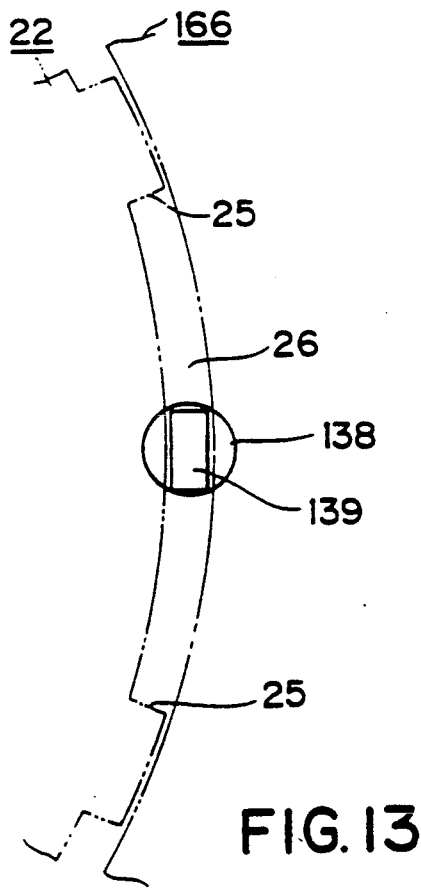
FIG. 13 is a schematic bottom plan view showing the pin inserted between the projections of the clutch disks of FIG. 12.

FIG. 9 shows the aligning and assembling apparatus 16. The aligning and assembling apparatus 16 includes a guide rail 122 provided on a post member 121, and a rotary head mounting plate 123 having a slider 124 fitted for up and down movement on the guide rail 122. A rotary head vertically moving cylinder 126 is secured at an upper portion of the post member 121 by way of a bracket 125 and has a piston rod 127 connected to the rotary head mounting plate 123. A hollow rotary shaft 132 is fitted for rotation on the mounting plate 123 by means of a bearing 131, and an annular rotary head 134 is provided in an integral relationship with a lower flange portion 133 of the rotary shaft 132. A plurality of positioning rollers 135 are supported for rotation on an outer periphery of the rotary head 134. A gear 136 is fitted in an integral relationship at an upper portion of the rotary shaft 132 and held in meshing engagement with a gear not shown of a rotary shaft of a variable speed motor 130 provided on the mounting plate 123. An air cylinder 137 is formed on the rotary head 134, and a piston 138 is fitted for up and down movement in the air cylinder 137 and has pins 139 formed in an integral relationship thereon The pins 139 have such a rectangular cross section as shown in FIG. 13.

Figure 10:
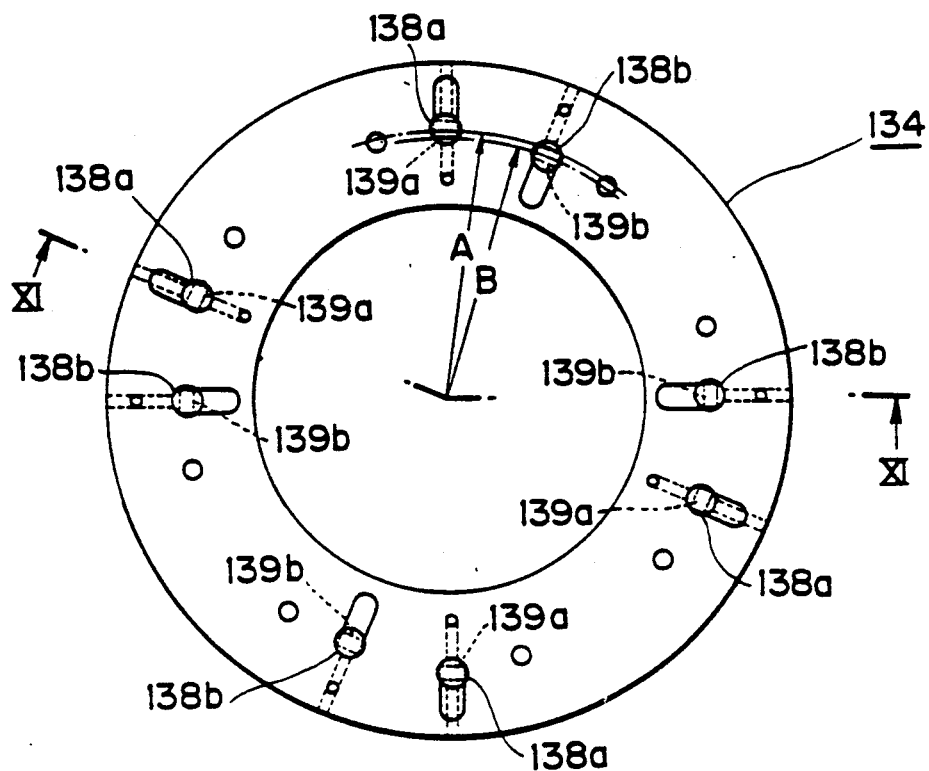
FIG. 10 is a plan view of a rotary head of the aligning and assembling apparatus of FIG. 9.

The pins 139 include, as shown in FIG. 10, four pins 139a disposed on a circumferential line of a radius A from the center of the rotary head 134, and other four pins 139b disposed on another circumferential line of a radius B (B<A) from the center of the rotary head 134. The pins 139a and 139b are disposed in an irregularly spaced relationship on the individual circumferential lines. The pins 139a and the other pins 139b are not used at the same time, but either the pins 139a or the pins 139b are selectively used in accordance with a type of works to be handled.

Figure 11:
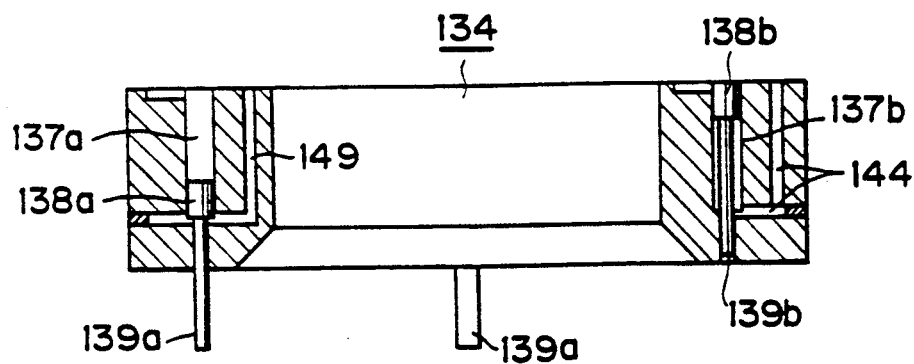
FIG. 11 is a sectional view taken along line XI—XI of FIG. 10.

Selection of the pins is performed by a pair of circuits of air supply paths shown in FIGS. 9 and 11. One of the air supply paths has a communicating hole 142 communicated with an air opening 140 shown in FIG. 9 by way of an annular groove 141. The communicating hole 142 is further communicated with an upper portion of each of air cylinders 137a located on the circumferential line of the larger diameter as shown in FIG. 11 so that a piston 138a within the cylinder 137a and a pin 139a integral with the piston 138a may be resiliently pushed downwardly by an air pressure The annular groove 143 is communicated with a lower portion of each of air cylinders 137b located on the circumferential line of the smaller diameter by way of a rotary head communicating hole 144 shown in FIG. 11 so that a piston 138b within the cylinder 137b and a pin 139b integral with the piston 138b may be pushed upwardly by an air pressure. Meanwhile, the other air supply path has a communicating hole 147 communicated with an air opening 145 shown in FIG. 9 by way of an annular groove 146. The communicating hole 147 is further communicated with an upper portion of each of the air cylinders 137b located on the circumferential line of the smaller diameter as shown in FIG. 11 so that the piston 138b within the cylinder 137b and the pin 139b integral with the piston 138b may be resiliently pushed downwardly by an air pressure. The annular groove 148 is communicated with a lower portion of each of the air cylinders 137a located on the circumferential line of the greater diameter by way of a rotary head communicating hole 149 shown in FIG. 11 so that the piston 138a within the cylinder 137a and the pin 139a integral with the piston 138a may be pushed upwardly by an air pressure.

Accordingly, if magnetic valves or some other suitable controlling elements not shown are controlled to control supply of air into the air opening 140 and discharge of air through the other air opening 145, only the pins 139a in the air cylinders 137a located on the circumferential line of the greater diameter are resiliently projected from the rotary head 134 as shown in FIG. 11 while the other pins 139b in the air cylinders 137b are retracted into the rotary head 134. On the other hand, if air is discharged through the air opening 140 while air is supplied into the other air opening 145, only the pins 139b in the air cylinders 137b located on the circumferential line of the smaller diameter are resiliently projected from the rotary head 134 while the pins 139a in the air cylinders 137a located on the circumferential line of the greater diameter are retracted into the rotary head 134. In this manner, the pins 139 can readily cope with a change in diameter of clutch plates 22 to be handled by the same.

Returning back to FIG. 9, an air cylinder 152 for a pusher is mounted on an upper side of the rotary head mounting plate 123 by means of a supporting member 151, a rod 154 slidably fitted for up and down movement within the hollow rotary shaft 132 is connected to a piston rod of the cylinder 152, and a disk-shaped pusher 155 made of a plastic material is mounted in an integral relationship at a lower end portion of the rod 154. The pusher 155 operates to resiliently press against an upper face of stacked works with an air pressure to drop the works compulsorily into the inside of a clutch guide 21.

Figure 12:
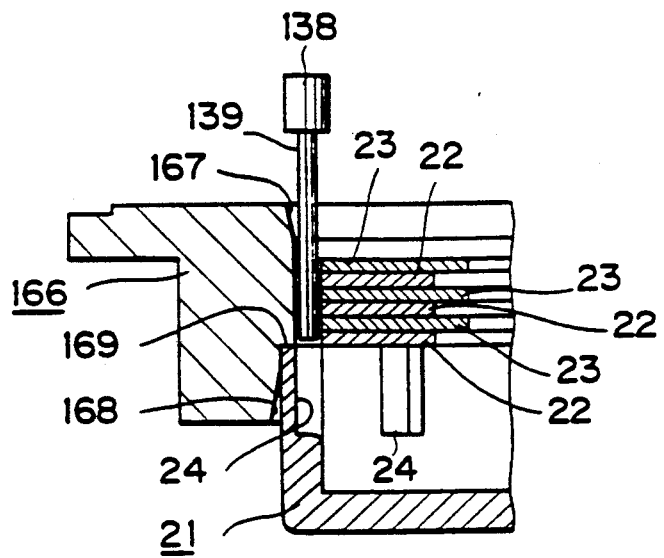
FIG. 12 is an enlarged cross sectional view showing a pin inserted between projections of clutch disks.

Since movement of the pusher 155 is the same as movement of a piston within the cylinder 152, if a pair of contactless switches 157 and 158 are provided at upper and lower portions of the cylinder 152 each by means of a band 156 in order to detect movement of the internal piston of the cylinder 152, then movement of the pusher 155 in the up and down directions can be detected Here, the upper contactless switch 157 acts as an upward movement stopping sensor while the lower contactless switch 158 acts as a pushing completing sensor Further, a pair of sliders 162 of a work guide mounting member 161 are fitted for up and down movement at a lower portion of the guide rail 122 of the post member 121, and a cylinder 164 for moving a work guide upwardly and downwardly is secured to the post member 121 by means of a bracket 163. A piston rod 165 of the cylinder 164 is connected to the work guide mounting member 161, and an annular work guide 166 is fitted in an integral relationship with the work guide mounting member 161. As shown in FIG. 12, a tapered face 167 is formed at an upper portion of an inner circumferential face of the work guide 166 for permitting smooth insertion of works into the inside of the work guide 166 while another tapered face 168 is formed at a lower face of the inner circumferential face of the work guide 166 for permitting smooth insertion of a clutch guide 21 into the inside of the work guide 166. A step or shoulder 169 is provided above the tapered face 168 of the work guide 166 for engaging with an upper end of the clutch guide 21.

Such a clutch guide 21 is placed by means of a jig 172 on a pallet 171 which is transported by the work transporting conveyor 120 and thus transported to a position just below the work guide 166 by the conveyor 120.

In the following, operation of the aligning and assembling apparatus 16 will be described.

(a) After a clutch guide 21 carried in by means of a pallet 171 is positioned just below the work guide 166, the work guide 166 is moved down by the cylinder 164 and thus fitted around the outer periphery of the clutch guide 21 to center the clutch guide 21 thereto.

(b) Six stacked works carried by the chuck 108 of the transporting apparatus 15 are set in position in the work guide 166 and placed on an opening edge of the clutch guide 21. The inner diameter of the work guide is made a little smaller than the diameter of the recessed grooves on the inner side of the clutch guide so that it may act as a downwardly moving guide upon centering and assembling of clutch plates 22.

(c) The rotary head 134 is moved down by the cylinder 126 Since the four pins 139 are projected downwardly from the rotary head 134 and individually formed in an integral relationship with the pistons 138 of the small air cylinders 137 such that they may be retracted readily into the rotary head 134 by a force from below, when the rotary head 134 is moved down, a pin 139 will be retracted in case it is contacted with and stopped by an upper face of a projection 25 of a clutch plate 22, but it can extend to a position between adjacent projections 25 of a lowermost clutch plate 22 in case it is positioned in the recesses 26 between adjacent projections of all of the clutch plates 22 as shown in FIG. 13.

(d) When the rotary head 134 is rotated by a rotating force transmitted to the gear 136 from the variable speed motor 130, a pin 139 which has been held stopped by an upper face of a projection 25 of a clutch plate 22 will soon be disengaged from the projection 25 of the clutch plate 22 so that it will finally inserted in recesses 26 between adjacent projections 25 of the three clutch plates 22 as shown in FIG. 12. Then, as the circular movement of the pins 139 is continued by the rotary head 134, the pins 139 will be engaged with the projections 25 in a circumferential direction to turn the clutch plates 22 until the projections 25 of the clutch plates 22 are aligned with each other.

(e) As rotation of the rotary head 134 further continues, the projections 25 of the lowermost one of the clutch plates 22 are aligned with the recessed grooves 24 of the clutch guide 21 whereupon the lowermost clutch plates 22 drops into the clutch guide 21 together with a clutch disk 23 lying on the upper side thereof. Each time the rotary head 134 is rotated by a further angle of 45 degrees, the second clutch plate 22 and clutch disk 23 and the third clutch plate 22 and clutch disk 23 are successively permitted to drop into the clutch guide 21. In this instance, the pusher 155 located in the inside of the rotary head 134 exerts a downward urging force so as to facilitate dropping of the clutch plates 22. In particular, since the difference (clearance) between the width of the clutch guide recessed grooves 24 and the width of the clutch plate projections 25, just at an instant when such a clearance appears, the pusher 155 exerts an acceleration to push and drop a clutch plate. Since, in connection with this, the variable speed motor 130 is used as a motor for driving the rotary head 134, a best assembling condition can be established by adjusting the rotational speed of the variable speed motor 130 together with an air pressure of the air cylinder 152 of the pusher 155. It is to be noted that since the projections 25 of the three clutch plates 22 are aligned with each other during rotation of the clutch plates 22, when the projections 25 of the clutch plates 22 are aligned with the recessed grooves 24 of the clutch guide 21, two or three of the clutch plates 22 may sometimes drop into the clutch guide 21 together with clutch disks 23 lying thereon.

(f) When assembly of a total of 6 clutch plates 22 and clutch disks 23 is completed, the internal piston of the pusher cylinder 152 reaches the position of the contactless switch 158 so that the contactless switch 158 is turned on to detect such completion of assembly.

It is to be noted that the embodiment described hereinabove has the following excellent advantages. In particular, since disk-shaped works are compulsorily pressed by the pusher 155, the recessed grooves 24 of the clutch guide 21 and the projections 25 of the clutch plates 22 which have only a small clearance left therebetween can be fitted with each other with certainty and with a high degree of efficiency. Further, since the plurality of pins 139 on the rotary head 134 are disposed in an irregularly spaced relationship with respect to distances of the projections 25 of disk-shaped works, one of the pins 139 may be inserted between adjacent projections 25 from the beginning without being disturbed by any projection 25 of the disk-shaped works, and accordingly the disk-shaped works can be assembled in a short period of time without having a loss time. Moreover, since the pins 139 of the rotary head 134 are formed in an integral relationship with the pistons 138 of the air cylinders 137, an equal air pressure is normally applied to the pins 139, and the resilient pressing force of the pins 139 can be varied readily by adjusting the air pressure. Besides, since either ones of the pins 139a and 139b which are disposed on circumferential lines of different diameters are selectively projected from the rotary head 134 when they are to be used, the rotary head 134 can readily cope with two different type of disk-shaped works having different diameters only by changing over the air supply passages, and accordingly, arrangement for the two types of disk-shaped works can b made very easily.

However, the present invention is not limited to the specific embodiment described hereinabove. In particular, works are not limited to such a clutch guide or such clutch plates 22 or clutch disks 23 as described hereinabove. Further, the pusher 155 is not necessarily required Meanwhile, only one pin 139 may otherwise be provided, or else a plurality of pins 139 may be disposed in an equidistantly spaced relationship With respect to the projections 25 which are spaced in an equidistantly spaced relationship of a disk-shaped work. Further, a spring, a weight or me other element may be employed as means for resiliently pushing down the pins 139. In addition, the two groups of pins 139a and 139b provided on the rotary head 134 are only intended for illustration, and any number of groups of such pins may be provided.

According to the present invention, an apparatus for aligning and assembling such disk-shaped works having projections on outer peripheries thereof as clutch plates which are assembled in an alternate relationship with a plurality of clutch disks to the inside of a clutch guide in order to form a multiple disk clutch has such a construction as described in detail hereinabove. Thus, since disk-shaped Works on a vessel-shaped work are rotated by the pin until the projections of the disk-shaped works are aligned with the recessed grooves of the vessel-shaped work to fit the disk-shaped works into the vessel-shaped work, there is no necessity of aligning operation between the projections of disk-shaped works and the recessed grooves of the vessel-shaped work until after a plurality of disk-shaped works are placed on the vessel-shaped work. Accordingly, setting of the disk-shaped works can be made readily, and an assembling operation of such works can be made readily with certainty.

Further, since only a mechanism for moving the pin on a circumferential line must be mainly provided, the assembling apparatus which is used for assembling operation of such works can be formed in a comparatively simple construction.

While the invention has been described and shown with particular reference to the preferred embodiment, it will be apparent that variations might be possible that would fall within the scope of the present invention which is not intended to be limited except as defined in the following claims.

What is claimed is:

1. An apparatus for assembling a plurality of disk-shaped works having projections formed on outer peripheries thereof to a vessel-shaped work having recessed grooves formed on an inner periphery thereof with said projections of said disk-shaped works fitted in said recessed grooves of said vessel-shaped work comprising:

work guide means mounted for up and down movement for positioning said vessel-shaped work at a predetermined position and for guiding said plurality of disk-shaped works in a stacked condition to a position on an opening edge of said vessel-shaped work;

a rotary head mounted for rotation in a coaxial relationship with and above said work guide means;

a pin mounted for up and down movement on said rotary head at a radial position of said projections of said disk-shaped works over a distance sufficient to cover the overall height of said disk-shaped works in the stacked condition;

means for resiliently urging said pin to move downwardly until an end of said pin reaches a position between adjacent ones of said projections of a lowermost one of said disk-shaped works in the stacked condition;

means for rotationally driving said rotary head; and a pusher adapted to push said disk-shaped works downwardly so as to facilitate dropping of said disk-shaped works into the inside of said vessel-shaped work and means for driving said pusher.

2. The apparatus according to claim 1 wherein a plurality of pins are mounted for up and down movement on said rotary head with an irregularly spaced relationship.

3. The apparatus according to claim 2 wherein said plurality of pins are divided into two groups, one group being disposed on a circumferential line of a predetermined radius from the center of said rotary head and the other group being disposed on a circumferential line of another predetermined radius from the center of said rotary head.

4. An automatic assembling apparatus for multiple disk clutch comprising:

a work stacking mechanism for stacking a plurality of clutch plates having projections formed thereon and clutch disks alternately, said work stacking mechanism including first stocking means for stocking a plurality of stacked clutch plates at a predetermined first work supply position, second stocking means for stocking a plurality of stacked clutch disks at a predetermined second work supply position, means for receiving said clutch plates and said clutch disks alternately, a stacking arm pivotally mounted for rocking motion between said first and second work supply positions and said receiving means, and chuck means mounted on said stacking arm for chucking the uppermost clutch plate and clutch disk alternately;

transporting means for transporting said alternately stacked clutch plates and clutch disks to an assembling position; and an assembling mechanism for assembling said alternately stacked clutch plates and clutch disks into a clutch guide having recessed grooves formed on an inner periphery thereof, said assembling mechanism including a work guide mounted for up and down movement for positioning said clutch guide at a predetermined position and for guiding said alternately stacked clutch plates and clutch disks to a position on an opening edge of said clutch guide, a rotary head mounted for rotation in a coaxial relationship with and above said work guide, a pin mounted for up and down movement on said rotary head at a radial position of said projections of said clutch plates over a distance sufficient to cover the overall height of said stacked clutch plates and clutch disks, means for resiliently urging said pin to move downwardly until an end of said pin reaches a position between adjacent ones of said projections of a lowermost one of said clutch plates, and means for rotationally driving said rotary head.

* * * * *